(No Model.)
H. C. WHITE
COTTON CHOPPER, CULTIVATOR, AND PLOW.
No. 284,930. Patented Sept. 11, 1883.
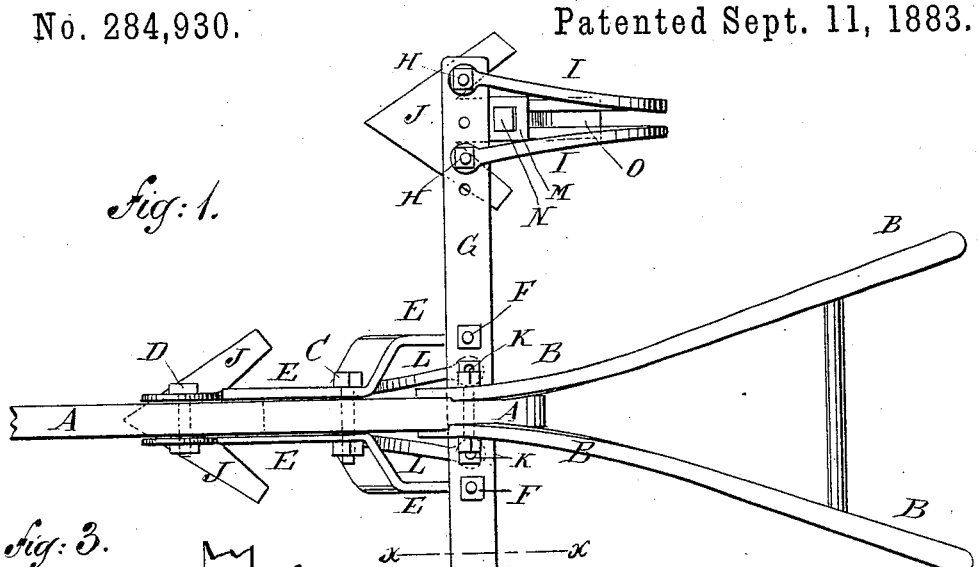
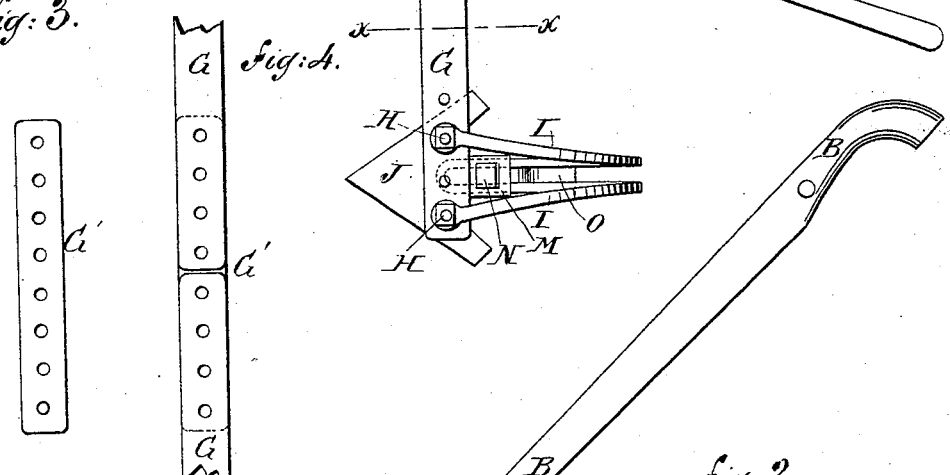
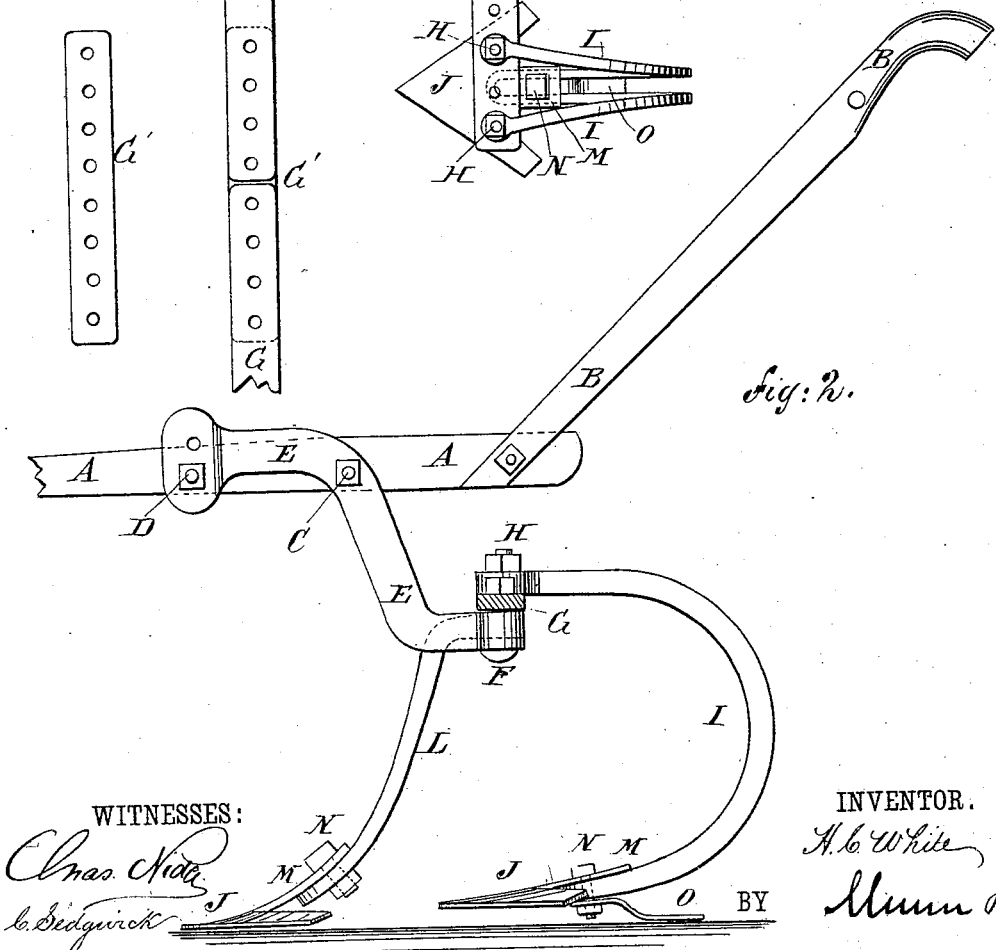

United States Patent Office.

HENRY C. WHITE, OF JUG TAVERN, ASSIGNOR TO HIMSELF, AND HEDGES L. SPENCER, OF SOCIAL CIRCLE, GEORGIA.

COTTON CHOPPER, CULTIVATOR, AND PLOW.

SPECIFICATION forming part of Letters Patent No. 284,980, dated September 11, 1883.

Application filed May 16, 1883. (No model.)

*To all whom it may concern:*

Be it known that I, HENRY COBB WHITE, of Jug Tavern, in the county of Jackson and State of Georgia, have invented certain new and useful Improvements in Cotton Choppers, Cultivators, and Plows, of which the following is a full, clear, and exact description.

Reference is to be had to the accompanying drawings, forming part of this specification, in which similar letters of reference indicate corresponding parts in all the figures.

Figure 1 is a plan view of my improvement arranged as a cotton-chopper. Fig. 2 is a sectional side elevation of the same, taken through the line $x\, x$, Fig. 1. Fig. 3 is a plan view of the short horizontal bar. Fig. 4 represents the arrangement of horizontal bars for a marker.

The object of this invention is to facilitate the cultivation of cotton and other crops planted in rows and drills.

The invention has also the further object of lessening the number of implements necessary to be bought by the farmer for the proper cultivation of his crops.

The invention relates to a cotton chopper, cultivator, and plow constructed with a beam provided with handles, and having bars attached to it, the said bars having attached to them a horizontal bar, to which are secured the plow-standards. The plow-standards are made double, and are curved downward and forward to bring their lower ends into a horizontal position to receive the cutters. The cutters are made with an angular forward edge, and with a rearwardly-projecting perforated tongue between their wings, to adapt them to be attached to the plow-standards in a horizontal position. To the cutters, and to the lower ends of the plow-standards, are attached rearwardly-projecting plates to slide upon the ground and prevent the cutters from working too deeply in the soil, as will be hereinafter fully described.

A represents a plow-beam, to the rear parts of which are attached handles B. The beam A and handles B may be the stock of an ordinary plow, or may be made expressly for this machine.

To the opposite sides of the rear part of the beam A are secured by two bolts, C D, the forward parts of two bars, E, the forward ends of which are widened vertically, and have several holes formed through them to receive the bolt D, so that the said bars E can be readily adjusted to raise and lower their rear ends. The rear parts of the bars E are bent outward, downward, and rearward, as shown in Figs. 1 and 2, and to their rear ends is secured by bolts F the middle part of a horizontal bar, G.

To the end parts of the bar G are secured by bolts H the upper ends of the double or U standards I, which are curved downward and forward to bring their lower ends into a horizontal position to receive the cutters J.

To the middle part of the bar G, between the ends of the bars E, are secured by bolts K the upper ends of the double standard L, which projects forward, and is bent downward and forward to bring its lower end into proper position to receive its cutter J. The cutters J are made with an angular forward or cutting edge, and have tongues M formed upon or attached to them between their wings, which tongues are perforated to receive the bolts N, that secure the said cutters J to the standards I L. The cutters J are made horizontal, or nearly so, so that they will not raise the soil and throw it against the plants left for a stand. Several holes are formed in the end parts of the bar G, to receive the bolts H, so that the standards I can be adjusted at a greater or less distance apart to leave more or less plants to a hill, as may be desired.

In using the machine as a chopper it is drawn across the rows, and will leave the plants between the cutters uninjured. The forward cutter should be at such a distance in front of the rear cutters that it will reach the next row before the rear cutters have left the row last chopped, to prevent the cutters from dropping into the furrows between the rows, and thus working too deeply in the soil.

To the lower sides of the lower ends of the standards are secured by the bolts N the forward ends of plates O, which are curved downward and rearward to slide upon the ground and prevent the cutters J from working too deeply in loose soil.

In case the improvement is applied to an ordinary plow-stock, the center standard, L, may be omitted, and the center cutter, J, attached to the standard of the said stock.

When the machine is to be used as a cultivator or plow, the cutters J are detached, and replaced by plow-plates of such a shape and size as the work to be done may require.

In case a two-plow cultivator be required, the long bar, G, is replaced by a short bar, G', having holes at one end to receive the bolts F K, and holes at the other end to receive the bolts H, as shown in Fig. 3.

In case the machine is to be used as a marker, two bars G are placed end to end upon a short bar G', and the three bars are secured to each other and to the bars E by the bolts F K, and the standards L I are provided with suitable marking-teeth. In this case the bars G should be strengthened in position by braces attached at their rear ends to the outer parts of the said bars G, and at their forward ends to the plow-beam A.

Having thus described my invention, I claim as new and desire to secure by Letters Patent—

1. The bar E, having bends outwardly, downwardly, and rearwardly, as shown in the drawings, a series of horizontal transverse bolt-holes near one end, and a vertical hole at the other end, in combination with beam A and cross-bar G, as described.

2. In a cotton chopper, cultivator, and plow, the combination, with the plow-beam A and the plow-standards I L, of the connecting-bars E and the horizontal bar G, substantially as herein shown and described, whereby the said standards and beam are connected adjustably, as set forth.

HENRY C. WHITE.

Witnesses:
M. F. MALSBY,
D. F. C. TIMMONS.